(12) United States Patent
Li et al.

(10) Patent No.: US 12,013,769 B2
(45) Date of Patent: Jun. 18, 2024

(54) HOT-STANDBY REDUNDANCY CONTROL SYSTEM, METHOD, CONTROL APPARATUS, AND COMPUTER READABLE STORAGE MEDIUM

(71) Applicant: Siemens Aktiengesellschaft, Munich (DE)

(72) Inventors: Dong Li, Beijing (CN); Xiao Bo Yang, Beijing (CN); Tong Zhou Wang, Beijing (CN); Yao Lei Tang, Beijing (CN); Chuan Yu Zhang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 712 days.

(21) Appl. No.: 17/059,282

(22) PCT Filed: May 31, 2018

(86) PCT No.: PCT/CN2018/089283
§ 371 (c)(1),
(2) Date: Nov. 27, 2020

(87) PCT Pub. No.: WO2019/227401
PCT Pub. Date: Dec. 5, 2019

(65) Prior Publication Data
US 2021/0216417 A1 Jul. 15, 2021

(51) Int. Cl.
*G06F 11/00* (2006.01)
*G06F 9/455* (2018.01)
(Continued)

(52) U.S. Cl.
CPC ...... *G06F 11/2028* (2013.01); *G06F 9/45558* (2013.01); *G06F 13/20* (2013.01); *G06F 2009/45579* (2013.01)

(58) Field of Classification Search
CPC ............. G06F 11/2023; G06F 11/2097; G06F 11/2007; G06F 11/2028; G06F 11/2038;
(Continued)

(56) References Cited

U.S. PATENT DOCUMENTS 10,372,561 B1\* 8/2019 Wei ...................... G06F 11/1088
2005/0256591 A1 11/2005 Rule et al.
(Continued)

FOREIGN PATENT DOCUMENTS

| CN | 1945480 A | 4/2007 |
|---|---|---|
| CN | 103324156 A | 9/2013 |

(Continued)

OTHER PUBLICATIONS

International Search Report and Written Opinion dated Feb. 25, 2019.
(Continued)

*Primary Examiner* — Charles Ehne
(74) *Attorney, Agent, or Firm* — Harness, Dickey & Pierce, P.L.C.

(57) ABSTRACT

A hot-standby redundancy control system is disclosed. In an embodiment, the system includes multiple primary control apparatuses, each respectively running a process of the hot-standby redundancy control system; a backup control apparatus pool including at least one industrial personal computer (IPC), with multiple virtual control apparatuses being established on at least one IPC, and the multiple virtual control apparatuses established being in one-to-one correspondence with the multiple primary control apparatuses, and each respective multiple virtual control apparatus running a same process as a respective corresponding primary control apparatus; a control bus, to connect one or more of the t least one IPC in the multiple primary control apparatuses and the backup control apparatus pool; and a
(Continued)

field bus, to connect one or more of the at least one IPC in the multiple primary control apparatuses and the backup control apparatus pool and multiple field apparatuses.

16 Claims, 2 Drawing Sheets

(51) Int. Cl.
  *G06F 11/20* (2006.01)
  *G06F 13/20* (2006.01)
(58) Field of Classification Search
  CPC ............. G06F 11/2041; G06F 11/2033; G06F 11/1456; G06F 11/2025; G06F 11/181; G06F 11/2092
  See application file for complete search history.

(56) References Cited

U.S. PATENT DOCUMENTS

| | | | |
|---|---|---|---|
| 2011/0029675 A1* | 2/2011 | Yeow | G06F 11/2041 709/226 |
| 2013/0277969 A1 | 10/2013 | Conroy et al. | |
| 2015/0058659 A1* | 2/2015 | Brundridge | G06F 11/203 714/4.11 |
| 2015/0081267 A1 | 3/2015 | Conroy et al. | |
| 2018/0052451 A1 | 2/2018 | Billi-Duran et al. | |

FOREIGN PATENT DOCUMENTS

| | | |
|---|---|---|
| CN | 103514043 A | 1/2014 |
| JP | 2016031658 A | 3/2016 |
| JP | 2017151585 A | 8/2017 |

OTHER PUBLICATIONS

Zhu, Lei et al: "A design of decentralized dual mode redundant hot standby arbitration swich-over logic and architecture"; 2018 International Conference on Lelctronic Technology (ICET), IEEE; May 23, 2019 (May 23, 2019), pp. 216-219, XP033368540.

Extended European Search Report dated Nov. 11, 2021.

Chaves, Andrew et al: "Improving the cyber resilience of industiral control systems"; International Journal on Critical Infractucture Protection, Elsevier, Amsterdam, NL; vol. 17, Apr. 3, 2017 (Apr. 3, 2017), pp. 30-48, XP085026065.

* cited by examiner

HOT-STANDBY REDUNDANCY CONTROL SYSTEM, METHOD, CONTROL APPARATUS, AND COMPUTER READABLE STORAGE MEDIUM

PRIORITY STATEMENT

This application is the national phase under 35 U.S.C. § 371 of PCT International Application No. PCT/CN2018/089283, which has an International filing date of May 31, 2018, which designated the United States of America, the entire contents of which are hereby incorporated herein by reference.

FIELD

Embodiments of invention relate present invention relates to a hot-standby redundancy control system, method, control apparatus, and computer-readable storage medium.

BACKGROUND

Generally, a key controller in an industrial control system that is operating needs to be subjected to hot-standby redundancy to improve the reliability of the system; this ensures that the system operates continuously even when an abnormality has occurred.

Generally, a backup controller is configured as a backup for each key controller (also known as a primary controller) in a conventional hot-standby redundancy control system. When the system operates properly, the primary controller and the backup controller can receive the same input signal at the same time and process the input signal at the same time; however, in normal conditions, only the primary control can produce output.

SUMMARY

The inventors have discovered that when a primary controller becomes faulty, since the backup controller is also operating, the backup controller can immediately produce output in place of the primary controller, thereby ensuring that the system continues operating. It is clear that such a hot-standby redundancy control system can provide extremely high reliability and excellent convenience for an industrial control system; however, such a configuration of primary and backup controllers in a ratio of 1:1 also leads to a massive increase in system costs.

At least one embodiment of the present invention provides a hot-standby redundancy control system, comprising:
multiple primary control apparatuses, each running one process of the hot-standby redundancy control system thereon;
a backup control apparatus pool including one or more industrial personal computers (IPCs), wherein multiple virtual control apparatuses are established on at least one of the IPCs, the multiple virtual control apparatuses established on the one or more IPCs are in one-to-one correspondence with the multiple primary control apparatuses, and each run the same process as the corresponding primary control apparatus;
a control bus for connecting the multiple primary control apparatuses and one or more of the IPCs in the backup control apparatus pool to allow communication between the multiple primary control apparatuses and the multiple virtual control apparatuses; and
a field bus for connecting the multiple primary control apparatuses, one or more of the IPCs in the backup control apparatus pool, and multiple field apparatuses for allowing communication between the multiple primary control apparatuses, multiple virtual control apparatuses, and multiple field apparatuses.

At least one embodiment of the present invention further provides a control apparatus, comprising:
hardware including a processor, a memory, a magnetic disk, and an input/output interface;
multiple virtual control apparatuses, in one-to-one correspondence with multiple primary control apparatuses in multiple primary control apparatuses, each running the same process as the corresponding primary control apparatus;
a general-purpose operating system for providing a configuration management program and an interface for managing multiple virtual control apparatuses; and
a virtual machine monitor, running on the hardware, for configuring hardware resources for virtual control apparatuses.

At least one embodiment of the present invention further discloses a hot-standby redundancy method applicable to an IPC that runs at least one virtual control apparatus, the method comprising:
periodically receiving, by each virtual control apparatus in the multiple virtual control apparatuses, via a control bus of the control system, a heartbeat signal from the corresponding primary control apparatus, wherein the multiple virtual control apparatuses are in one-to-one correspondence with multiple primary control apparatuses in the control system and each virtual control apparatus runs the same process as the corresponding primary control apparatus; and
outputting, when a virtual control apparatus has received no heartbeat signals from the corresponding primary control apparatus via the control bus within a preset time, a self-outputted signal to the corresponding field apparatus in the control system via a field bus of the control system.

An embodiment of the present application further provides a computer-readable storage medium for storing a computer program that, when executed by a processor, implements at least one embodiment of the above-described hot-standby redundancy method.

BRIEF DESCRIPTION OF THE DRAWINGS

Preferred embodiments of the present application will be described in detail below with reference to drawings, so that those of ordinary skill in the art become clearer about the above-described and other characteristics and advantages of the present application; among the drawings.

Figure 1:
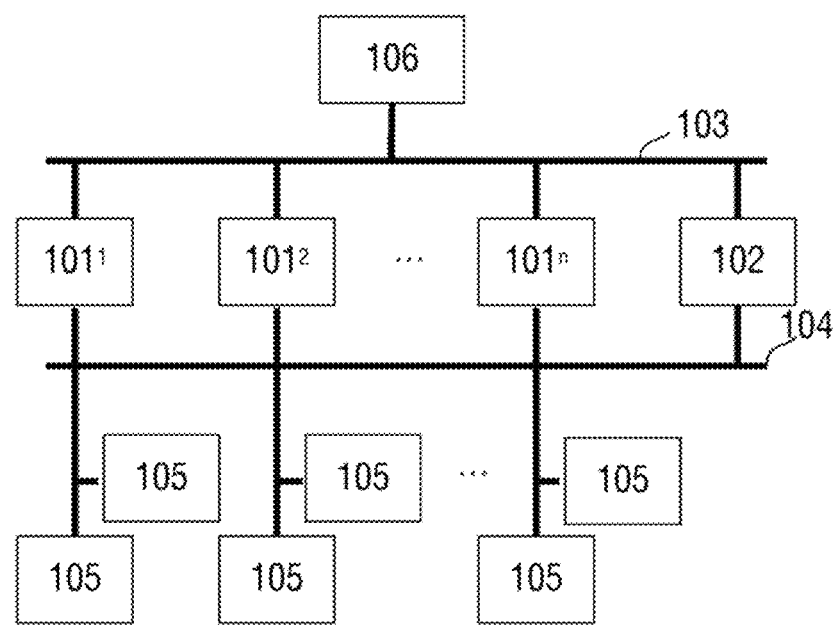
FIG. 1 is a structural diagram for a hot-standby redundancy control system as described in an embodiment of the present application.

The reference numerals used in the drawings are as follows:

| | |
|---|---|
| $101_1$-$101_n$ | Primary control apparatuses |
| 102 | Backup control apparatus pool |
| 103 | Control bus |
| 104 | Field bus |
| 105 | Field apparatus |
| 106 | Central control apparatus |
| 201 | IPC hardware |
| $202_1$-$202_x$ | Virtual control apparatuses |
| 203 | General-purpose operating system |
| 204 | Virtual machine monitor |
| 301-304 | Steps |
| 3011-3013 | Steps |

DETAILED DESCRIPTION OF THE EXAMPLE EMBODIMENTS

At least one embodiment of the present invention provides a hot-standby redundancy control system, comprising:

multiple primary control apparatuses, each running one process of the hot-standby redundancy control system thereon;

a backup control apparatus pool including one or more industrial personal computers (IPCs), wherein multiple virtual control apparatuses are established on at least one of the IPCs, the multiple virtual control apparatuses established on the one or more IPCs are in one-to-one correspondence with the multiple primary control apparatuses, and each run the same process as the corresponding primary control apparatus;

a control bus for connecting the multiple primary control apparatuses and one or more of the IPCs in the backup control apparatus pool to allow communication between the multiple primary control apparatuses and the multiple virtual control apparatuses; and a field bus for connecting the multiple primary control apparatuses, one or more of the IPCs in the backup control apparatus pool, and multiple field apparatuses for allowing communication between the multiple primary control apparatuses, multiple virtual control apparatuses, and multiple field apparatuses.

From the above-described hot-standby redundancy control system structure of at least one embodiment, it is clear that multiple physical controllers are simulated by establishing multiple virtual control apparatuses on one IPC, so that one IPC may function as a backup control apparatus of multiple primary control apparatuses at the same time. Thus, the backup mode in a conventional hot-standby redundancy scheme in which the primary and backup control apparatuses must be configured in a ratio of 1:1 is changed to a backup mode in which one physical apparatus provides hot-standby backup for multiple primary control apparatuses. This allows a dramatic decrease in the hardware cost of the control system without reducing the reliability of the control system.

In an embodiment of the present application, the control bus 103 and the field bus 104 may be implemented by a standard bus that is based on industrial Ethernet technology.

It is thus clear that, in an embodiment of the present application, the primary control apparatuses 1011-101n, the backup control apparatus pool 102, as well as the field apparatuses 105 and the central control apparatus 106 are connected to one another by a control bus and/or a field bus; such a bus-type connection mode is simpler. In addition, the field bus 104 may be implemented by a standard bus that is based on industrial Ethernet technology, requiring less connections compared with the connection mode of a conventional hot-standby redundancy control system in which a primary controller and a backup controller must be respectively connected to the corresponding field apparatus; thus, hardware resources of the control system may be further saved to reduce the hardware cost of the control system.

In an embodiment of the present application, the IPC comprises:

IPC hardware 201, the IPC hardware (201) comprising a processor, a memory, a magnetic disk, and an input/output interface;

multiple virtual control apparatuses $202_1$-$202_x$, in one-to-one correspondence with multiple primary control apparatuses in multiple primary control apparatuses 1011-101n, each running the same process as the corresponding primary control apparatus;

a general-purpose operating system 203 for providing a configuration management program and an interface for managing the multiple virtual control apparatuses $202_1$-$202_x$; and a virtual machine monitor 204, running on the IPC hardware 201, for configuring hardware resources for virtual control apparatuses $202_1$-$202_x$.

In an embodiment of the present application, by configuring the virtual machine monitor 204 on the IPC, an intermediate software layer may be established between the hardware and the operating system (a general-purpose operating system or a virtual machine) of the IPC, which is intended to logically divide the physical hardware of the IPC into multiple relatively independent parts that are configured for different operating systems, respectively, thereby simulating multiple hardware apparatuses with one hardware apparatus.

Establishment and management of virtual control apparatuses by using the virtual machine monitor 204 allows more effective implementation of a software backup scheme in which one physical apparatus simulates multiple physical backup controllers.

In an embodiment of the present application, the processor is a multi-core processor having M cores, M being an integer greater than 1, wherein one core of the multi-core processor runs the general-purpose operating system 203, and the remaining M−1 cores run M−1 virtual machines, respectively, to establish M−1 virtual control apparatuses.

In the above-described solution of at least one embodiment, each virtual control apparatus independently runs on a separate core of a multi-core controller of an IPC. This ensures that the virtual control apparatuses each run in parallel and independently, without the need for queuing processes at the processor. Thus, the response speed of a virtual control apparatus is guaranteed and processing delay greatly reduced to further assure the reliability of the control system.

In an embodiment of the present application, the number of the one or more IPCs is determined on the basis of the number of processes running in the control system and the number of cores of the multi-core processor.

By the above-described method, the number of IPCs in the backup control apparatus pool 102 may be determined definitively at the beginning of the configuration of the control system, so that hardware resources required by the control system may be determined quickly for convenience of implementation.

At least one embodiment of the present invention further provides a control apparatus. The control apparatus comprises:

- hardware 201, the IPC hardware (201) comprising a processor, a memory, a magnetic disk, and an input/output interface;
- multiple virtual control apparatuses $202_1$-$202_x$, in one-to-one correspondence with multiple primary control apparatuses in multiple primary control apparatuses $101_1$-$101_n$, each running the same process as the corresponding primary control apparatus;
- a general-purpose operating system 203 for providing a configuration management program and an interface for managing multiple virtual control apparatuses $202_1$-$202_x$; and
- a virtual machine monitor 204, running on the hardware 201, for configuring hardware resources for virtual control apparatuses $202_1$-$202_x$.

In an embodiment of the present application, by configuring the virtual machine monitor 204 on the control apparatus, an intermediate software layer may be established between the hardware and the operating system (a general-purpose operating system or a virtual machine) of the control apparatus, which is intended to logically divide the physical hardware of the control apparatus into multiple relatively independent parts that are configured for different operating systems, respectively, thereby simulating multiple hardware apparatuses with one hardware apparatus.

Establishment and management of virtual control apparatuses by using the virtual machine monitor 204 allows more effective implementation of a software backup scheme in which one physical apparatus simulates multiple physical backup controllers.

The processor is a multi-core processor having M cores, M being an integer greater than 1, wherein one core of the multi-core processor runs the general-purpose operating system 203, and the remaining M−1 cores run M−1 virtual machines, respectively, to establish M−1 virtual control apparatuses.

In the above-described solution of at least one embodiment, each virtual control apparatus independently runs on a separate core of a multi-core controller of an IPC; this ensures that the virtual control apparatuses each run in parallel and independently, without the need for queuing processes at the processor; thus, the response speed of a virtual control apparatus is guaranteed and processing delay greatly reduced to further assure the reliability of the control system.

At least one embodiment of the present invention further discloses a hot-standby redundancy method applicable to an IPC that runs at least one virtual control apparatus, the method comprising:

- periodically receiving, by each virtual control apparatus in the multiple virtual control apparatuses, via a control bus of the control system, a heartbeat signal from the corresponding primary control apparatus, wherein the multiple virtual control apparatuses are in one-to-one correspondence with multiple primary control apparatuses in the control system and each virtual control apparatus runs the same process as the corresponding primary control apparatus; and
- outputting, when a virtual control apparatus has received no heartbeat signals from the corresponding primary control apparatus via the control bus within a preset time, a self-outputted signal to the corresponding field apparatus in the control system via a field bus of the control system.

In the above-described method, multiple virtual control apparatuses are configured on one IPC to ensure that, while the reliability of the control system is guaranteed, the number of IPCs functioning as backup control apparatuses in the control system is much smaller than the number of primary control apparatuses in the control system. In other words, in terms of the number of physical apparatuses, the number of IPCs functioning as backup control apparatuses is much smaller than the number of primary control apparatuses. Thus, the hardware cost of the control system is greatly reduced.

In an embodiment of the present application, the running multiple virtual control apparatuses comprise: running a virtual machine monitor on the hardware of the IPC; running a general-purpose operating system on the virtual machine monitor, wherein the general-purpose operating system provides a configuration management program and a configuration management interface; and running, via the configuration management interface, multiple virtual machines on the virtual machine monitor as the multiple virtual control apparatuses.

Thus, by configuring a virtual machine monitor on the IPC, an intermediate software layer may be established between the physical hardware and the operating system (a general-purpose operating system or a virtual machine) of the IPC, which is intended to logically divide the physical hardware of the IPC into multiple relatively independent parts that are configured for different operating systems, respectively, thereby simulating multiple hardware apparatuses with one hardware apparatus.

In addition, establishment and management of virtual control apparatuses by running a virtual machine monitor on an IPC allows more effective implementation of a software backup scheme in which one physical apparatus simulates multiple physical backup controllers.

Further, in an embodiment of the present application, when the processor of an IPC is a multi-core processor having multiple cores, multiple established virtual machines may be in one-to-one correspondence with at least one core of the multi-core processor. Thus, established virtual control apparatuses may each run on one separate core of the multi-core controller; this ensures that the virtual control apparatuses each run in parallel and independently, without the need for queuing processes at the processor; thus, the response speed of a virtual control apparatus is guaranteed and processing delay greatly reduced to assure the reliability of the control system.

An embodiment of the present application further provides a computer-readable storage medium for storing a computer program that, when executed by a processor, implements at least one embodiment of the above-described hot-standby redundancy method.

In order to describe more clearly the objectives, technical solutions, and advantages of the present invention, the technical solutions in embodiments of the present invention will be explained clearly and completely below with reference to the drawings for embodiments of the present invention. Obviously, the described embodiments are only some, but not all, embodiments of the present invention. Any embodiments obtained by those of ordinary skill in the art based on the described embodiments of the present invention without making inventive efforts fall into the protection scope of the present invention.

The terms "comprising", "provided with", and any variants thereof in the description and claims of the present invention are intended to cover nonexclusive inclusion. For example, a process, method, system, product, or device comprising a series of steps or units are not necessarily limited to explicitly listed steps or units, and instead may include other steps or units that are not explicitly listed or are intrinsic to these processes, methods, systems, products, or devices.

As described above, one backup controller is configured for each key primary controller, for example, a programmable logic controller (PLC), in a conventional hot-standby redundancy control system, to establish 1:1 correspondence between the primary controllers and the backup controllers; thus, when a primary controller becomes faulty, the backup controller corresponding to the primary controller that has developed the fault immediately replaces it in continuing the operation, thereby ensuring continuous operation of the system. For example, assuming that M key processes exist in a control system, generally M PLCs need to be configured in the system to run the M key processes, respectively. In addition, if the control system adopts the conventional hot-standby redundancy technology, then M additional PLCs need to be configured as backup PLCs for the M PLCs, respectively. In other words, a total of 2×M PLCs are needed in the control system to ensure proper operation of the control system. It is thus clear that, if the conventional hot-standby redundancy technology is adopted, the number of controllers needed in a control system will increase dramatically, resulting in a massive increase in the hardware cost of the system.

To solve this problem, an embodiment of the present application provides a hot-standby redundancy control system based on a backup control apparatus pool, capable of greatly reducing the hardware cost of the control system while guaranteeing the reliability of the control system.

FIG. 1 shows a structural diagram for a hot-standby redundancy control system as described in an embodiment of the present application. As shown in FIG. 1, the hot-standby redundancy control system comprises: multiple primary control apparatuses $1011$-$101n$, a backup control apparatus pool 102, a control bus 103, a field bus 104, and multiple field apparatuses 105, n being a natural number greater than 1.

The multiple primary control apparatuses $1011$-$101n$ each run one process of the control system.

In an embodiment of the present application, the multiple primary control apparatuses $101_1$-$101_n$ specifically may be PLCs, distributed control systems (DCSs), or other control apparatuses applicable in the field of process control.

In an embodiment of the present application, the backup control apparatus pool 102 specifically may consist of one or more industrial personal computers (IPCs). On one IPC in the backup control apparatus pool 102, multiple virtual control apparatuses may be established at the same time, so that multiple virtual control apparatuses established on the one or more IPCs may be in one-to-one correspondence with the multiple primary control apparatuses $101_1$-$101_n$; in addition, the virtual control apparatuses each run the same process as the corresponding primary control apparatus, thereby respectively functioning as backup control apparatuses of the corresponding primary control apparatuses $101_1$-$101_n$. Since multiple virtual control apparatuses are configured on each IPC, in an embodiment of the present application, it may be guaranteed that the number of IPCs in the backup control apparatus pool 102 is much smaller than the number of primary control apparatuses $101_1$-$101_n$. In other words, in terms of the number of physical apparatuses, the number of IPCs functioning as backup control apparatuses is much smaller than the number of primary control apparatuses.

The control bus 103 is used for connecting the multiple primary control apparatuses $101_1$-$101_n$ and one or more of the IPCs in the backup control apparatus pool 102 to allow communication between the multiple primary control apparatuses $101_1$-$101_n$ and multiple virtual control apparatuses established on the one or more IPCs, wherein a virtual control apparatus may be a soft PLC or virtual PLC.

In an embodiment of the present application, the control bus 103 may be used for completing fault detection on the multiple primary control apparatuses $101_1$-$101_n$ and multiple virtual control apparatuses.

The control bus 103 is further used for connecting the multiple primary control apparatuses $101_1$-$101_n$, one or more IPCs in the backup control apparatus pool 102, and the one or more central control apparatuses 106. The one or more central control apparatuses 106 may, via the control bus 103, obtain operating status information about the multiple primary control apparatuses $101_1$-$101_n$ and the multiple virtual control apparatuses, thereby completing configuration, monitoring, and management of the multiple primary control apparatuses $101_1$-$101_n$ and the backup control apparatus pool 102. The central control apparatus 106 is generally located in a central control room to provide a configuration and management man-machine interface for the entire control system. Generally, the central control apparatus 106 may further be called "upper computer". The central control apparatus 106 may be implemented by one or more computers. Certainly, in order to achieve remote control, the central control apparatus 106 may also be implemented by cloud.

Specifically, in an embodiment of the present application, in a proper working status, the multiple primary control apparatuses $101_1$-$101_n$ each can periodically send a heartbeat signal via the control bus 103 to the corresponding virtual control apparatus, and each virtual control apparatus, based on a heartbeat signal received from the corresponding primary control apparatus, determines whether the corresponding primary control apparatus is working properly. In computer science, a heartbeat signal is a periodic signal generated by computer hardware or software, for indicating that the computer system is in a proper working status or performing synchronization, etc. In an embodiment of the present application, the heartbeat signal specifically may be implemented by a pulse signal; in addition, in order for the heartbeat signal to carry more information, for example, identification information about primary control apparatuses, the heartbeat signal specifically may also be implemented by a coded pulse signal. In an embodiment of the present application, if a virtual control apparatus has received no heartbeat signals from the corresponding primary control apparatus via the control bus 103 within a preset time, then it may be determined that the corresponding primary control apparatus has become faulty; in this case, the virtual control apparatus can immediately replace the corresponding primary control apparatus in controlling the field bus 104 to produce output.

In an embodiment of the present application, the hot-standby redundancy control system may further comprise one or more central control apparatuses 106. The central control apparatuses 106 may be connected to primary control apparatuses $101_1$-$101_n$ and one or more IPCs in the backup control apparatus pool 102 via the control bus 103. When a virtual control apparatus determines that the corresponding primary control apparatus has become faulty, it may report, via the control bus 103, the fault information about the primary control apparatus to the one or more central control apparatuses 106, thereby ensuring continuity of system operation and monitoring and giving an alarm about a control system fault.

In an embodiment of the present application, the control bus 103 may be implemented by a standard bus that is based on industrial Ethernet technology; for example, the control bus 103 may be implemented by a bus that meets the PROFINET bus standard provided by PROFIBUS International (PI) or the Ethernet control automation technology (EtherCAT) bus standard.

The field bus 104 is used for connecting the multiple primary control apparatuses $101_1$-$101_n$, one or more of the IPCs in the backup control apparatus pool 102, and multiple field apparatuses 105 for allowing communication between the multiple primary control apparatuses $101_1$-$101_n$, multiple virtual control apparatuses, and multiple field apparatuses 105.

In an embodiment of the present application, the field bus 104 may allow a primary control apparatus and the corresponding virtual control apparatus to synchronize input/output from/to the field apparatuses 105, so that either the primary control apparatus or the corresponding virtual control apparatus controls the corresponding field apparatus 105. Generally, the field apparatus 105 may also be called an I/O apparatus and so synchronization by a field bus may also be called IO synchronization.

Generally, operations performed by the field bus 104 may be divided into two parts: reading data from each field apparatus 105 and writing data to each field apparatus 105, wherein no synchronization is required for reading data from a field apparatus 105, while synchronization is required for writing data to a field apparatus 105. Common synchronization methods for writing data include: (1) the third-party arbitration method; when this method is adopted, both a primary control apparatus and a backup control apparatus can send a write signal and, instead of being directly connected to a field apparatus 105, are connected to a bus arbitration apparatus; the bus arbitration apparatus decides whose signal to select and then forwards the signal to a field apparatus 105; and (2) a method in which a backup control apparatus, when in a proper working status, autonomously listens for any heartbeat signals from a primary control apparatus; on detecting a heartbeat signal from a primary control apparatus, the backup control apparatus judges that the primary control apparatus has become faulty and then sends a write signal to a field apparatus 105.

Similar to the implementation mode of the control bus 103, in an embodiment of the present application, the field bus 104 may also be implemented by a standard bus that is based on industrial Ethernet technology; for example, the field bus 104 may be implemented by a standard bus that meets the PROFINET bus standard or the EtherCAT bus standard.

The control bus 103 and the field bus 104 guarantee the detection of any faults with a primary control apparatus and the corresponding virtual control apparatus, allowing either a primary control apparatus or the corresponding virtual control apparatus to control the field apparatuses 105, and ensuring continuity of the running of the control system.

The one or more central control apparatus 106 may, via the control bus 103, obtain status information about the multiple primary control apparatuses $101_1$-$101_n$ and one or more IPCs in the backup control apparatus pool 102, for example, primary/backup status information and apparatus fault information. The one or more central control apparatus 106 may also provide an administrator of the control system with an interface for configuring, monitoring, and managing the primary control apparatuses $101_1$-$101_n$ and the backup control apparatus pool 102, so that the administrator of the control system can configure, monitor, and manage the multiple primary control apparatuses $101_1$-$101_n$ and the backup control apparatus pool 102 through the interface.

From the hot-standby redundancy control system structure as shown in FIG. 1, it is clear that multiple physical controllers are simulated by establishing multiple virtual control apparatuses on one IPC, so that one IPC may function as a backup control apparatus of multiple primary control apparatuses at the same time; thus, the backup mode in a conventional hot-standby redundancy scheme in which the primary and backup control apparatuses must be configured in a ratio of 1:1 is changed to a backup mode in which one physical apparatus provides hot-standby backup for multiple primary control apparatuses. Generally, one physical backup control apparatus (IPC) may also simulate multiple physical backup control apparatuses (virtual control apparatuses) known as soft backup control apparatuses. Those of ordinary skill in the art may understand that such a hot-standby redundancy control solution using soft backup control apparatuses may greatly lower the hardware cost of the control system without reducing the reliability of the control system.

Further, in a hot-standby redundancy control system proposed by an embodiment of the present application, the primary control apparatuses $101_1$-$101_n$, the backup control apparatus pool 102, as well as the field apparatuses 105 and the central control apparatus 106 are connected to one another by a control bus and/or a field bus; therefore, such a bus-type connection mode is simpler.

In addition, as described above, the field bus 104 may be implemented by a standard bus that is based on industrial Ethernet technology, requiring less connections compared with the connection mode of a conventional hot-standby redundancy control system in which a primary controller and a backup controller must be respectively connected to the corresponding field apparatus; thus, hardware resources of the control system may be further saved to reduce the hardware cost of the control system.

The internal logical structure of an IPC in the backup control apparatus pool 102 as described in an embodiment of the present application will be described in detail below in conjunction with drawings.

Figure 2:
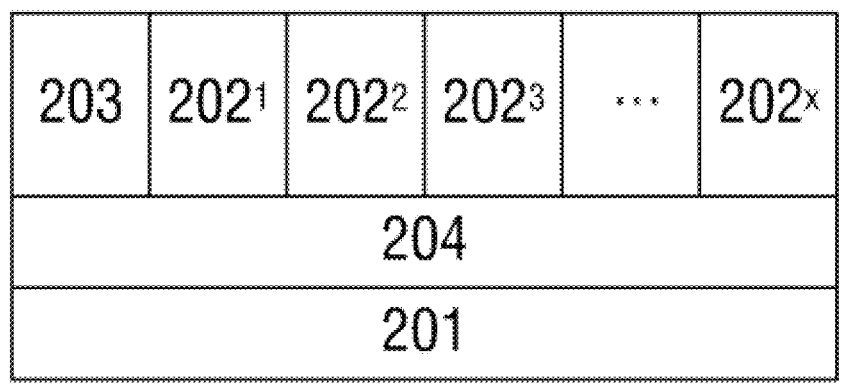
FIG. 2 is a diagram for the internal logical structure of an IPC in the backup control apparatus pool 102 as described in an embodiment of the present application.

FIG. 2 shows the internal logical structure of an IPC as described in an embodiment of the present application. As shown in FIG. 2, in an embodiment of the present application, an IPC may comprise: IPC hardware 201, multiple virtual control apparatuses $202_1$-$202x$, a general-purpose operating system (GPOS) 203, and a virtual machine monitor 204, x being a natural number greater than 1.

The IPC hardware 201 may comprise a processor, a memory, a magnetic disk, and an input/output (I/O) interface.

As described above, the multiple virtual control apparatuses $202_1$-$202_x$ are in one-to-one correspondence with x primary control apparatuses in the control system, and the virtual control apparatuses $202_1$-$202_x$ may each run the same key process as the corresponding primary control apparatus; in other words, the virtual control apparatuses $202_1$-$202_x$ may each function as a backup control apparatus of the corresponding primary control apparatuses $101_1$-$101_n$.

Note that, in an embodiment of the present application, the number of virtual control apparatuses that may be established in an IPC, x, is not restricted to being greater than or equal to the number of primary control apparatuses in the control system, n. If the number of primary control apparatuses in the control system, n, is smaller than or equal to the number of virtual control apparatuses that may be established in an IPC, x, then only one such IPC is needed for implementing hot-standby redundancy backup of all the n primary control apparatuses in the control system. If the number of primary control apparatuses in the control system, n, is greater than the number of virtual control apparatuses that may be established in an IPC, x, then multiple IPCs may be used for implementing hot-standby redundancy backup of all the n primary control apparatuses in the control system.

Specifically, in an embodiment of the present application, the virtual control apparatuses $202_1$-$202_x$ may be implemented by virtual machines. The virtual machines may run on the virtual machine monitor 204 and be configured and managed by a general-purpose operating system (GPOS) 203.

The GPOS 203 is a universal operating system that provides an interface for configuring a management program and managing all the virtual control apparatuses $202_1$-$202_x$. An administrator of the control system may configure and manage all the virtual control apparatuses $202_1$-$202_x$ through the interface provided by the GPOS 203. In addition, the GPOS 203 may further monitor and control a primary/backup status of the virtual control apparatuses $202_1$-$202_x$. For example, the GPOS 203, on detecting a fault with a primary control apparatus via the control bus 103, may switch the primary/backup status of the corresponding virtual control apparatus from "Backup" to "Primary" and may further report the primary status of the virtual control apparatus to the central control apparatus 106 via the control bus 103. Thus, the GPOS 203 may ensure that only one control apparatus (a primary control apparatus or the corresponding virtual control apparatus) in the control system is able to control a field apparatus 105 in the control system.

In an embodiment of the present application, by configuring the virtual machine monitor 204 on the IPC, an intermediate software layer may be established between the physical hardware and the operating system (a general-purpose operating system or a virtual machine) of the IPC, which is intended to logically divide the physical hardware of the IPC into multiple relatively independent parts that are configured for different operating systems, respectively, thereby simulating multiple hardware apparatuses with one hardware apparatus.

Those of ordinary skill in the art may understand that Hypervisor is an intermediate software layer running between physical software and an operating system and can function as a virtual machine monitor allowing multiple operating systems and applications to share the hardware. Hypervisor is generally used on a server, able to access all the physical hardware devices, including a magnetic disk and a memory, in the server. When the server is started and executes Hypervisor, it loads the operating systems of all the virtual machine clients, while allocating appropriate amounts of memory resources, processor resources, network resources, and disk hardware resources to each virtual machine.

Based on the information given above, in an embodiment of the present application, Hypervisor technology may be applied so that multiple virtual machines may be created and managed by running Hypervisor on an IPC, and these virtual machines are used to implement the above-mentioned multiple virtual control apparatuses. Specifically, the Hypervisor 204 directly runs on the IPC software 201, and the IPC software 201 is controlled such that appropriate amounts of hardware resources are allocated to the virtual control apparatuses $202_1$-$202_x$. It is thus clear that establishment and management of virtual control apparatuses by running Hypervisor on an IPC allows more effective implementation of a software backup scheme in which one physical apparatus simulates multiple physical backup controllers.

Establishment of multiple virtual control apparatuses on an IPC may allow hot-standby redundancy backup of multiple primary control apparatuses at the same time with one physical apparatus, achieving the purpose of reducing system costs; however, the problem that a processing delay of a virtual control apparatus occurs due to limitation of the CPU resources of an IPC may arise; consequently, switching between a primary controller and a backup controller fails to happen in a timely manner, and the system reliability is lowered. Therefore, in an embodiment of the present application, in order to ensure that, when a primary control apparatus becomes faulty, the corresponding backup control apparatus can quickly replace the primary control apparatus to shorten the processing delay of a virtual control apparatus, a multi-core processor may be used.

A method for creating multiple virtual control apparatuses $202_1$-$202_x$ on an IPC as described in an embodiment of the present application will be described in detail below.

Specifically, in an embodiment of the present application, the processor of each IPC is a multi-core processor; for example, if the IPC uses an Intel Core i7 as its processor, then the processor has four cores; if the IPC uses an Intel Core i9 as its processor, then the processor has 10 cores. Assume that the multi-core processor has M computing engines (core), M being a natural number greater than 1; then, in an embodiment of the present application, the GPOS 203 may run on one core of the multi-core processor, while M−1 virtual machines may run on the remaining M−1 computing engines, respectively, the M−1 virtual machines are in one-to-one correspondence with M−1 primary control apparatuses in the primary control apparatuses $101_1$-$101_n$, and the virtual machines each run the same key process as the corresponding primary control apparatus. In this case, each virtual machine functions as the virtual control apparatuses $202_1$-$202_{M-1}$ to become a backup control apparatus of a primary control apparatus. The GPOS 203 provides an interface for configuring and managing the M−1 virtual control apparatuses $202_1$-$202_{M-1}$. An administrator may configure and manage all the virtual control apparatuses $202_1$-$202_{M-1}$ through the interface provided by the GPOS 203, for example, mapping each of the virtual control apparatuses $202_1$-$202_{M-1}$ to M−1 cores of the multi-core processor.

From the above-described method for creating multiple virtual control apparatuses $202_1$-$202_{M-1}$ on an IPC, it is clear that the number of virtual control apparatuses that may be established on an IPC is related to the number of cores of its multi-core processor. Thus, it can be determined that, in an embodiment of the present application, the number of IPCs included in the backup control apparatus pool 102 is related to the number of key processes running in the control system and the number of cores of the multi-core processor of the IPC. Specifically, the number of IPCs included in the backup control apparatus pool 102 may be calculated according to the number of key processes running in the control system and the number of cores of the multi-core processor of the IPC. For example, in an embodiment of the present application, assume that N key processes exist in the control system and that the multi-core processor of an IPC functioning as a backup control apparatus pool has M cores; then, in an embodiment of the present application, the control system contains N primary controllers $101_1$-$101_N$, and its backup control apparatus pool 102 contains CEIL (N/(M−1)) IPCs, where CEIL( ) represents the round-up function; in other words, its return value is the smallest integer greater than or equal to the expression specified in the parentheses. For example, when N=3, M=4, which means that there are 3 key processes in the control system and that the multi-core processor of an IPC functioning as a backup control apparatus pool has 4 computing engines (cores), only 3 primary control apparatuses and 1 IPC are needed as IPCs in a backup control apparatus pool in a hot-standby redundancy control system according to the present application.

In contrast, in a conventional hot-standby redundancy control system, a total of 6 control apparatuses (3 primary control apparatuses and 3 backup control apparatuses) are needed. By the above-described calculation method, the number of IPCs in the backup control apparatus pool 102 may be determined definitively at the beginning of the configuration of the control system, so that hardware resources required by the control system may be determined quickly for convenience of implementation.

It is thus clear that the use of a method according to an embodiment of the present application can greatly reduce the number of backup control apparatuses required, thus reducing the hardware cost of the control system; especially, when the number of key processes in the control system is large, such a hot-standby redundancy system using soft backup control apparatuses can greatly reduce system hardware costs.

Moreover, in the above-described solution, each virtual control apparatus independently runs on a separate core of a multi-core controller of an IPC; this ensures that the virtual control apparatuses each run in parallel and independently, without the need for queuing processes at the processor; thus, the response speed of a virtual control apparatus is guaranteed and processing delay greatly reduced to assure the reliability of the control system.

Certainly, it should be noted that the present embodiment is only one example of the present invention; the present invention is not limited to the establishment of only one virtual control apparatus (virtual machine) on one processor core; certainly, one or more virtual control apparatuses may also be established on one processor core based on the real-time performance requirements of the control system, thereby further reducing the number of IPCs required by the control system or lowering the requirements for the number of IPC processor cores, in order to achieve the purpose of further reducing the hardware cost of the control system.

Corresponding to the above-described hot-standby redundancy control system, an embodiment of the present application further discloses a control apparatus, which can function as a backup control apparatus of the control system. The internal logical structure of the control apparatus, as shown in FIG. 2, may comprise: hardware 201, multiple virtual control apparatuses 202 1-202 $x$, a general-purpose operating system (GPOS) 203, and a virtual machine monitor 204. The specific function, structure, and implementation of each component have been described above, and so will not be described again herein.

In an embodiment of the present application, by configuring the virtual machine monitor 204 on the backup control apparatus, an intermediate software layer may be established between the hardware and the operating system (a general-purpose operating system or a virtual machine) of the IPC, which is intended to logically divide the physical hardware of the IPC into multiple relatively independent parts that are configured for different operating systems, respectively, thereby simulating multiple hardware apparatuses with one hardware apparatus.

In an embodiment of the present application, the virtual machine monitor 204 may be Hypervisor. Establishment and management of virtual control apparatuses by using Hypervisor as the virtual machine monitor 204 allows more effective implementation of a software backup scheme in which one physical apparatus simulates multiple physical backup controllers.

In an embodiment of the present application, the processor in the IPC hardware may be a multi-core processor having M cores, M being an integer greater than 1, wherein one core of the multi-core processor runs the general-purpose operating system 203, and the remaining M−1 cores run M−1 virtual machines, respectively, to establish M−1 virtual control apparatuses. In the above-described solution, each virtual control apparatus may independently run on a separate core of a multi-core controller of an IPC; this ensures that the virtual control apparatuses each run in parallel and independently, without the need for queuing processes at the processor; thus, the response speed of a virtual control apparatus is guaranteed and processing delay greatly reduced to further assure the reliability of the control system.

Figure 3:
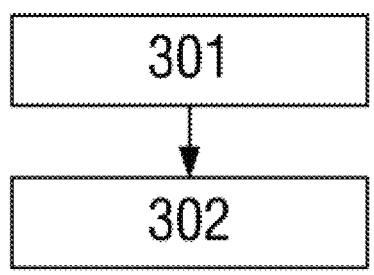
FIG. 3 is a flowchart for a hot-standby redundancy method as described in an embodiment of the present application.

Corresponding to the above-mentioned backup control apparatus, an embodiment of the application further discloses a hot-standby redundancy method, which is applied to an industrial personal computer (IPC) running at least one virtual control apparatus. FIG. 3 shows a flowchart of a hot-standby redundancy method according to an embodiment of the present application. As shown in FIG. 3, the method comprises: Step 301: Periodically receiving, by each virtual control apparatus in the multiple virtual control apparatuses, via a control bus of the control system, a heartbeat signal from the corresponding primary control apparatus, wherein the multiple virtual control apparatuses are in one-to-one correspondence with multiple primary control apparatuses in the control system and each virtual control apparatus runs the same process as the corresponding primary control apparatus; and Step 302: Outputting, when a virtual control apparatus has received no heartbeat signals from the corresponding primary control apparatus via the control bus within a preset time, a self-outputted signal to the corresponding field apparatus in the control system via a field bus of the control system.

In this step, when a virtual control apparatus has received no heartbeat signals from the corresponding primary control apparatus via the control bus within a preset time, the virtual control apparatus determines that the corresponding primary control apparatus has become faulty and then changes its primary/backup status from "Backup" to "Primary", and may further report the primary/backup status information to the central control apparatus of the control system via a control bus.

In the above-described method, multiple virtual control apparatuses are configured on one IPC to ensure that the number of IPCs functioning as backup control apparatuses in the control system is much smaller than the number of primary control apparatuses in the control system. In other words, in terms of the number of physical apparatuses, the number of IPCs functioning as backup control apparatuses is much smaller than the number of primary control apparatuses. Thus, the hardware cost of the control system is greatly reduced.

Figure 4:
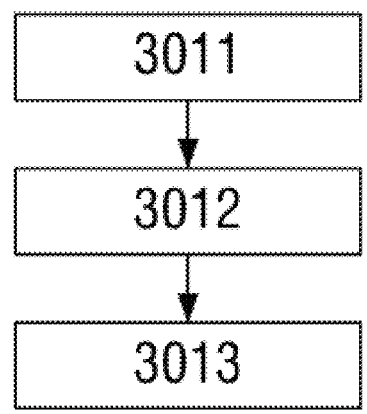
FIG. 4 is a flowchart for a specific method for establishing x virtual control apparatuses on an IPC that functions as a backup control apparatus according to an embodiment of the present application.

In an embodiment of the present application, at least one virtual control apparatus is run on the above-mentioned IPC functioning as a backup control apparatus; its specific implementation method may be shown in FIG. 4, which specifically comprises the following steps:

Step 3011: Run a virtual machine monitor on the hardware of an IPC;

Step 3012: Run a general-purpose operating system on the virtual machine monitor, wherein the general-purpose operating system provides a configuration management interface;

Step 3013: Run, through the configuration management interface, multiple virtual machines on the virtual machine monitor as the multiple virtual control apparatuses.

In an embodiment of the present application, by configuring a virtual machine monitor on the IPC, an intermediate software layer may be established between the physical hardware and the operating system (a general-purpose operating system or a virtual machine) of the IPC, which is intended to logically divide the physical hardware of the IPC into multiple relatively independent parts that are configured for different operating systems, respectively, thereby simulating multiple hardware apparatuses with one hardware apparatus.

Specifically, in an embodiment of the present application, Hypervisor technology may be applied to the above-mentioned virtual machine monitor; in other words, directly run Hypervisor on the IPC hardware 201 to control the IPC hardware to allocate appropriate amounts of hardware resources to each virtual machine. It is thus clear that establishment and management of virtual control apparatuses by running Hypervisor on an IPC allows more effective implementation of a software backup scheme in which one physical apparatus simulates multiple physical backup controllers.

Furthermore, in an embodiment of the present application, when the processor of the IPC is a multi-core processor, in Step 3013 described above, x virtual machines may be established that are in one-to-one correspondence with the x cores of the multi-core processor. Thus, each established virtual control apparatus may independently run on a separate core of a multi-core controller; this ensures that the virtual control apparatuses each run in parallel and independently, without the need for queuing processes at the processor; thus, the response speed of a virtual control apparatus is guaranteed and processing delay greatly reduced to assure the reliability of the control system.

Certainly, it should be noted that the present embodiment is only one example of the present invention; the present invention is not limited to the establishment of only one virtual control apparatus (virtual machine) on one processor core; certainly, one or more virtual control apparatuses may also be established on one processor core based on the real-time performance requirements of the control system, thereby further reducing the number of IPCs required by the control system or lowering the requirements for the number of IPC processor cores, in order to achieve the purpose of further reducing the hardware cost of the control system.

An embodiment of the present application further provides a computer-readable storage medium for storing a computer program that, when executed by a processor, implements an embodiment of the above-described hot-standby redundancy method.

It should be understood that although the specification describes the embodiments separately, an embodiment does not contain only one independent technical solution, and that such a method of description is only for the sake of clarity; those of ordinary skill in the art should treat the specification as a whole, and the technical solutions provided in the embodiments can be appropriately combined into other embodiments that those of ordinary skill in the art understand.

The detailed descriptions given above are only specific descriptions of feasible embodiments of the present invention. They are not intended to limit the scope of protection of the present invention, and any equivalent implementation modes or alterations, such as a combination, division, or repetition of features, made without departing from the technical spirit of the present invention should fall into the protection scope of the present invention.

The invention claimed is:

1. A hot-standby redundancy control system, comprising:
multiple primary control apparatuses, each of the multiple primary control apparatuses configured to respectively run a process of the hot-standby redundancy control system;
a backup control apparatus pool, the backup control apparatus pool including at least one industrial personal computer (IPC), the at least one IPC configured to establish multiple virtual control apparatuses, the multiple virtual control apparatuses established on the at least one IPC being in one-to-one correspondence with the multiple primary control apparatuses, and wherein each respective multiple virtual control apparatus is configured to run a same process as a respective corresponding primary control apparatus;
a control bus connecting one or more of the multiple primary control apparatuses and the at least one IPC; and
a field bus connecting the one or more of the multiple primary control apparatuses, the at least one IPC, and multiple field apparatuses.

2. The hot-standby redundancy control system of claim 1, wherein the control bus and the field bus are implemented by a standard bus based on industrial Ethernet technology.

3. The hot-standby redundancy control system of claim 2, wherein the at least one IPC comprises:
a processor configured to cause the at least one IPC to run
a general-purpose operating system configured to provide a configuration management program and an interface for managing the multiple virtual control apparatuses, and
a virtual machine monitor configured to allocate hardware resources to the virtual control apparatuses.

4. The hot-standby redundancy control system of claim 3, wherein the processor is a multi-core processor having M cores, M being an integer greater than 1, and
wherein the processor is configured to
run the general-purpose operating system ie n-on one core of the multi-core processor, and
run M−1 virtual machines on the remaining M−1 cores to establish M−1 virtual control apparatuses.

5. The hot-standby redundancy control system of claim 4, wherein a number of the one or more IPCs is based upon a number of processes running in the control system and a number of cores of the multi-core processor.

6. The hot-standby redundancy control system of claim 1, wherein the at least one IPC comprises:
a processor configured to cause the at last one IPC to run the multiple virtual control apparatuses, a general-purpose operating system configured to provide a configuration management program and an interface for managing the multiple virtual control apparatuses, and a virtual machine monitor configured to allocate hardware resources to the virtual control apparatuses.

7. The hot-standby redundancy control system of claim 1, wherein the processor is a multi-core processor having M cores, M being an integer greater than 1, and wherein the processor is configured to run the general-purpose operating system on one core of the multi-core processor, and run M−1 virtual machines on the remaining M−1 cores to establish M−1 virtual control apparatuses.

8. The hot-standby redundancy control system of claim 7, wherein a number of the one or more IPCs is based upon a number of processes running in the control system and a number of cores of the multi-core processor.

9. A control apparatus, comprising:

a processor configured to cause the control apparatus to run multiple virtual control apparatuses in one-to-one correspondence with multiple primary control apparatuses, each respective virtual control apparatus, of the multiple virtual control apparatuses, running a same process as a corresponding respective primary control apparatus, of the multiple primary control apparatuses;

run a general-purpose operating system configured to provide a configuration management program and an interface for managing the multiple virtual control apparatuses; and run a virtual machine configured to configure hardware resources for the multiple virtual control apparatuses.

10. The control apparatus of claim 9, wherein the processor is a multi-core processor having M cores, M being an integer greater than 1, and wherein the processor is configured to run the general-purpose operating system on one core of the multi-core processor, and run M−1 virtual machines on the M−1 remaining cores of the multi-core processor, respectively, to establish M−1 virtual control apparatuses.

11. A hot-standby redundancy method, applicable to an industrial personal computer (IPC) running at least one virtual control apparatus, the method comprising:

periodically receiving, by each virtual control apparatus of multiple virtual control apparatuses via a control bus of a control system, a heartbeat signal from a corresponding primary control apparatus, wherein said multiple virtual control apparatuses are in respective one-to-one correspondence with multiple primary control apparatuses in the control system and wherein each respective virtual control apparatus runs a same process as a corresponding primary control apparatus; and outputting, in response to a respective virtual control apparatus having received no heartbeat signals from a corresponding primary control apparatus via said control bus within a given time, a self-outputted signal to a corresponding field apparatus in the control system via a field bus of the control system.

12. The method of claim 11, further comprising:

running a virtual machine monitor on hardware of the IPC;

running a general-purpose operating system on the virtual machine monitor, the general-purpose operating system configured to provide a configuration management program and a configuration management interface; and running, via the configuration management interface, multiple virtual machines on the virtual machine monitor as the multiple virtual control apparatuses.

13. The method of claim 12, wherein a processor of the IPC is a multi-core processor having multiple cores, and wherein the multiple virtual machines are in one-to-one correspondence with multiple cores of the multi-core processor.

14. A non-transitory computer-readable storage medium storing computer-readable instructions that, when executed by a processor, cause an apparatus to implement the hot-standby redundancy method of claim 11.

15. A non-transitory computer-readable storage medium storing computer readable instructions that, when executed by a processor, cause an apparatus to implement the hot-standby redundancy method of claim 6.

16. A non-transitory computer-readable storage medium storing computer readable instructions that, when executed by a processor, cause an apparatus to implement the hot-standby redundancy method of claim 13.

* * * * *